United States Patent [19]

Nishino et al.

[11] Patent Number: 5,361,205
[45] Date of Patent: Nov. 1, 1994

[54] APPARATUS FOR TRANSLATING LINGUAL MORPHEMES AS WELL AS THE TYPOGRAPHICAL MORPHEMES ATTACHED THERETO

[75] Inventors: Fumihito Nishino; Jun Ibuki; Naohito Nakamura, all of Kawasaki, Japan

[73] Assignee: Fujitsu Limited, Kawasaki, Japan

[21] Appl. No.: 923,513

[22] Filed: Aug. 3, 1992

[30] Foreign Application Priority Data

Aug. 1, 1991 [JP] Japan .................................. 3-192897

[51] Int. Cl.$^5$ ............................................. G06F 15/38
[52] U.S. Cl. ................................................. 364/419.02
[58] Field of Search ............... 364/419, 419.02, 419.05, 364/419.04

[56] References Cited

FOREIGN PATENT DOCUMENTS 0021169 1/1992 Japan ........................... G06F 15/38

*Primary Examiner*—Gail O. Hayes
*Attorney, Agent, or Firm*—Staas & Halsey

[57] ABSTRACT

An apparatus which translates a document (character string) having various kinds of typographical information, such as on a font size and on a font style, as character attributes, and reflects the typographical information attached to an original text of the document. The apparatus performs a morpheme analysis with typographical information saved, by regarding a piece of typographical information as a morpheme for a document having typographical information between characters. The apparatus judges typographical information attached to each character forming a morpheme after performing a morpheme analysis for a sentence having a piece of typographical information as a character attribute, and determines morpheme typographical information when characters forming a single morpheme carry different pieces of typographical information. The apparatus also separates a sentence whose morpheme is analyzed into a piece of typographical information and an original text translates the original document into some other language and converts to an appropriate one the piece of typographical information as necessary, anticipation of a case in which the piece of typographical information attached to the original document cannot be attached "as is" to its translation result.

15 Claims, 9 Drawing Sheets

| STATE | VALUE |
|---|---|
| (INITIAL) | 1 |
| AFTER READING " A " | 2 |
| AFTER READING " BIRD " | 3 |
| AFTER READING " \ UNDERLINE " | 3 |
| AFTER READING " HAS " | 4 |
| AFTER READING " FLOWN " | 5 |

FIG. 8A

| WORD | TYPOGRAPHICAL ATTRIBUTE |
|---|---|
| A | NIL |
| BIRD | NIL |
| HAS | UNDERLINE |
| FLOWN | NIL |

FIG. 8B

| MORPHEME | MORPHOLOGICAL ATTRIBUTE | UNDERLINE ATTRIBUTE |
|---|---|---|
| A | IA | ABSENT |
| BIRD | CN | ABSENT |
| HAS FLOWN | VI / PPT | PRESENT, ABSENT |

FIG. 8C

| MORPHOLOGICAL ATTRIBUTE | UNDERLINE REPRESENTATIVE WORD |
|---|---|
| IA | FIRST WORD |
| CN | LAST WORD |
| VI / PPT | FIRST WORD |

FIG. 8D

| MORPHEME | MORPHOLOGICAL ATTRIBUTE | UNDERLINE ATTRIBUTE |
|---|---|---|
| A | IA | ABSENT |
| BIRD | CN | ABSENT |
| HAS FLOWN | VI / PPT | PRESENT |

FIG. 9A

The power of a SUN

FIG. 9B

The \s+2 power \s0 of a \fB SUN \fP.

FIG. 10

| The | NIL |
| --- | --- |
| Power | \s+2 |
| of | NIL |
| a | NIL |
| SUN | \fB |

FIG. 15

Die \s+2 Macht \s0
einer
. ul
SONNE

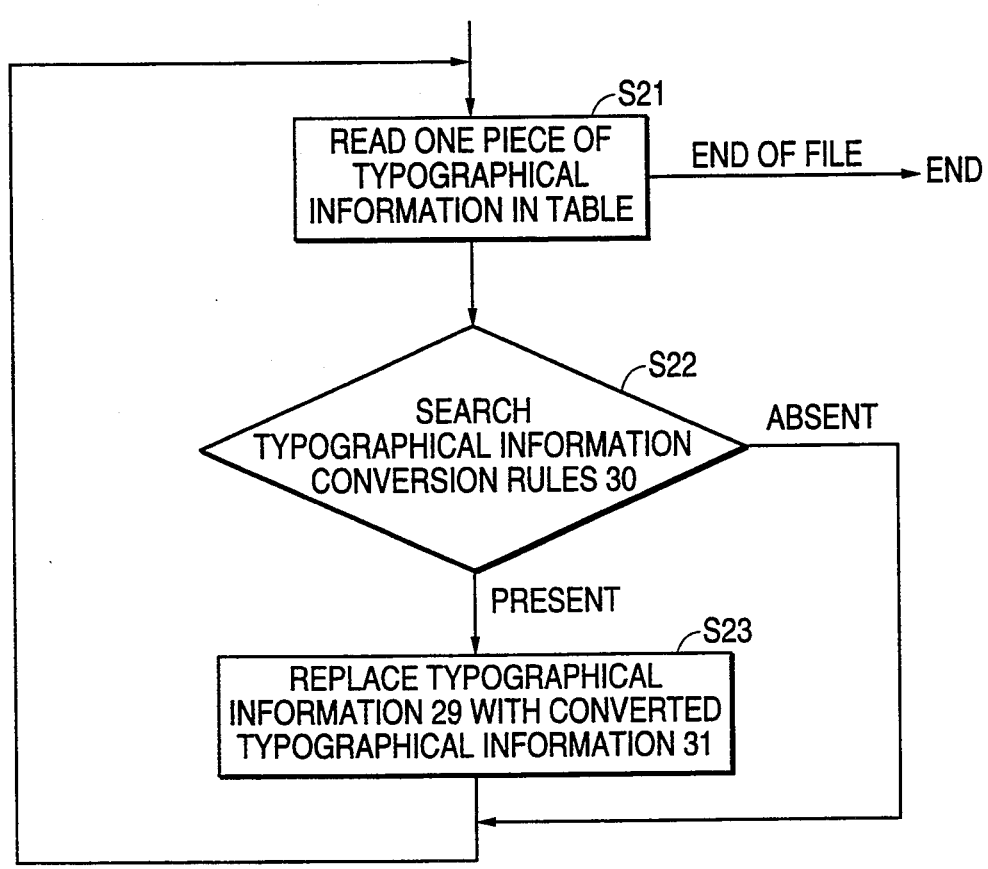

APPARATUS FOR TRANSLATING LINGUAL MORPHEMES AS WELL AS THE TYPOGRAPHICAL MORPHEMES ATTACHED THERETO

BACKGROUND OF THE INVENTION

1. Field of the Invention

This invention relates to an apparatus for translating a document having typographical information, capable of reflecting in a translated document the typographical information attached to an original text.

2. Description of the Related Arts

With recent advances in the arts for word processing and DTP (desk top publishing), many a document carries with it various pieces of typographical information, such as ones on fonts (character styles, e.g. German, Swiss and Dutch). font sizes (eight [8] points, etc.), font styles (e.g. Standard, Italic, Underline, Bold and Shadowed) and colors. Since typographical information expresses some sort of an intent of an author of a document, it is requested to reflect such typographical information in the translation result for an accurate conveyance of information and for good appearance.

It has been customary to ignore typographical information in analyzing a morpheme of a document having typographical information.

However, a translation result obtained by such a morpheme analysis can hardly, albeit not entirely impossibly, express the appropriate intention of the author. To overcome this problem, it is necessary to automatically reflect in the translation result the typographical information attached to an original text.

To realize this, it is conceivable first to analyze a morpheme with typographical information saved, second to translate an original text by separating the typographical information from the original text, and third to attach the typographical information to the translation result.

A prior art existed whereby a bold part in an input document is detected for making bold the corresponding part in the translation result. (Japanese Patent Early Disclosure 1988 No.220361)

According to the prior art, for instance, a word "Yama" is translated into "Mountain" by reflecting the bold attribute. That is, the prior art causes the translation result to reflect "as is" the typographical information attached to an original text.

However, the prior art remains silent about a specific example of a morpheme analysis, such as a case in which characters forming a morpheme have different pieces of typographical information. As well, since pieces of typographical information may not correspond with each other between two [2] different languages, there is a case in which typographical information attached to an original text cannot be used "as is" for the translation result.

For example, English font names such as Helvetica, Times and Courier cannot be directly applicable to Japanese font names. Besides, due to a constraint on output hardware, there is a case in which six [6] point Chinese characters are too small to be outputted although English six [6] point characters can be outputted normally, or there is a case in which a user wishes to convert a certain piece of typographical information to some other piece of typographical information with intention. Further, there is even a case in which a document input device or a document output device accepts no typographical information whatsoever.

SUMMARY OF THE INVENTION

This invention aims at enabling a morpheme to be analyzed with typographical information saved, and at enabling typographical information attached to an original text to be reflected in a translation result through its conversion into user designated typographical information by using a morpheme analysis for appropriately reflecting the typographical information in the original text in the translation result, thereby realizing an apparatus for translating a document having typographical information contributing to the improvement in a translation quality.

Receiving a sentence having as an attribute a piece of typographical information between characters or a typographical attribute on a character, this invention causes the apparatus for translating a document having typographical information to analyze a morpheme of the sentence with its typographical information saved.

More specifically, when an input sentence has a piece of typographical information provided between characters, by referring to an ordinary lingual morpheme dictionary for analyzing a morpheme of an ordinary language and a typographical morpheme dictionary for analyzing a morpheme with a piece of typographical information, the apparatus for translating a document having typographical information analyzes a morpheme of the sentence by treating a piece of the typographical information as one [1] morpheme and by checking a connecting relation between morphemes through a discrimination between an ordinary lingual morpheme and a typographical morpheme.

On the other hand, when an input sentence has a typographical attribute on a character, after referring to an ordinary lingual morpheme dictionary for analyzing a morpheme of an ordinary language, the apparatus for translating a document having typographical information analyzes a morpheme of the sentence by identifying pieces of typographical information assigned respectively to characters forming a single word, and by converting, as morphemes, pieces of typographical information if different pieces of typographical information are assigned respectively to the characters forming the single word.

This enables a morpheme of a document having typographical information to be analyzed with the typographical information saved.

Then, the apparatus for translating a document having typographical information separates the sentence whose morphemes have thus been analyzed into a text and a piece of typographical information, thereby having a translation unit translate the text and having a typographical information conversion unit convert the piece of typographical information into some other appropriate piece of typographical information as necessary. The apparatus for translating a document having typographical information performs the conversion, such that a piece of typographical information attached to an original text incapable of being used in a translation result in a different language is converted into some other piece of typographical information appropriately conveying an intent of the author of the original text, and attaches the converted piece of typographical information to the translation result.

Thus, the apparatus for translating a document having typographical information attaches to a translation result a piece of typographical information properly reflecting an intent of an author of an original text, thereby producing a translation result of an extremely high quality.

BRIEF DESCRIPTION OF THE DRAWINGS

One of skill in the art can easily understand additional features and objects of this invention from the description of the preferred embodiments and some of the attached drawings. In the drawings:

FIGS. 8A through 8D are tables explaining in further detail the second embodiment shown in FIG. 7, in which FIG. 8A shows a roll-out of an input document, FIG. 8B shows a result of a morpheme analysis, FIG. 8C shows contents of a morpheme information pattern typographical representative character table, and FIG. 8D shows an output of a morpheme list;

FIGS. 9A and 9B illustrate an example of converting typographical information in the second embodiment, in which FIG. 9A represents an example of an input document having typographical information and FIG. 9B expresses the input document by using a troff system;

FIG. 10 is a table showing an example of a morpheme analysis by a typographical information conversion unit with typographical information saved;

FIG. 11 is a table showing a translation result obtained from the example shown in FIG. 10;

FIG. 12 is a table showing as an example a typographical information conversion rule;

FIG. 13 is a flowchart showing operational steps of the typographical information conversion unit;

FIG. 14 is a table showing the correspondence between the translation result and the converted typographical information; and FIG. 15 illustrates the translation result having converted typographical information (shown in FIG. 14) by using the troff system.

DESCRIPTION OF THE PREFERRED EMBODIMENT

Overview of the Principle of the Present Invention

Figure 1:
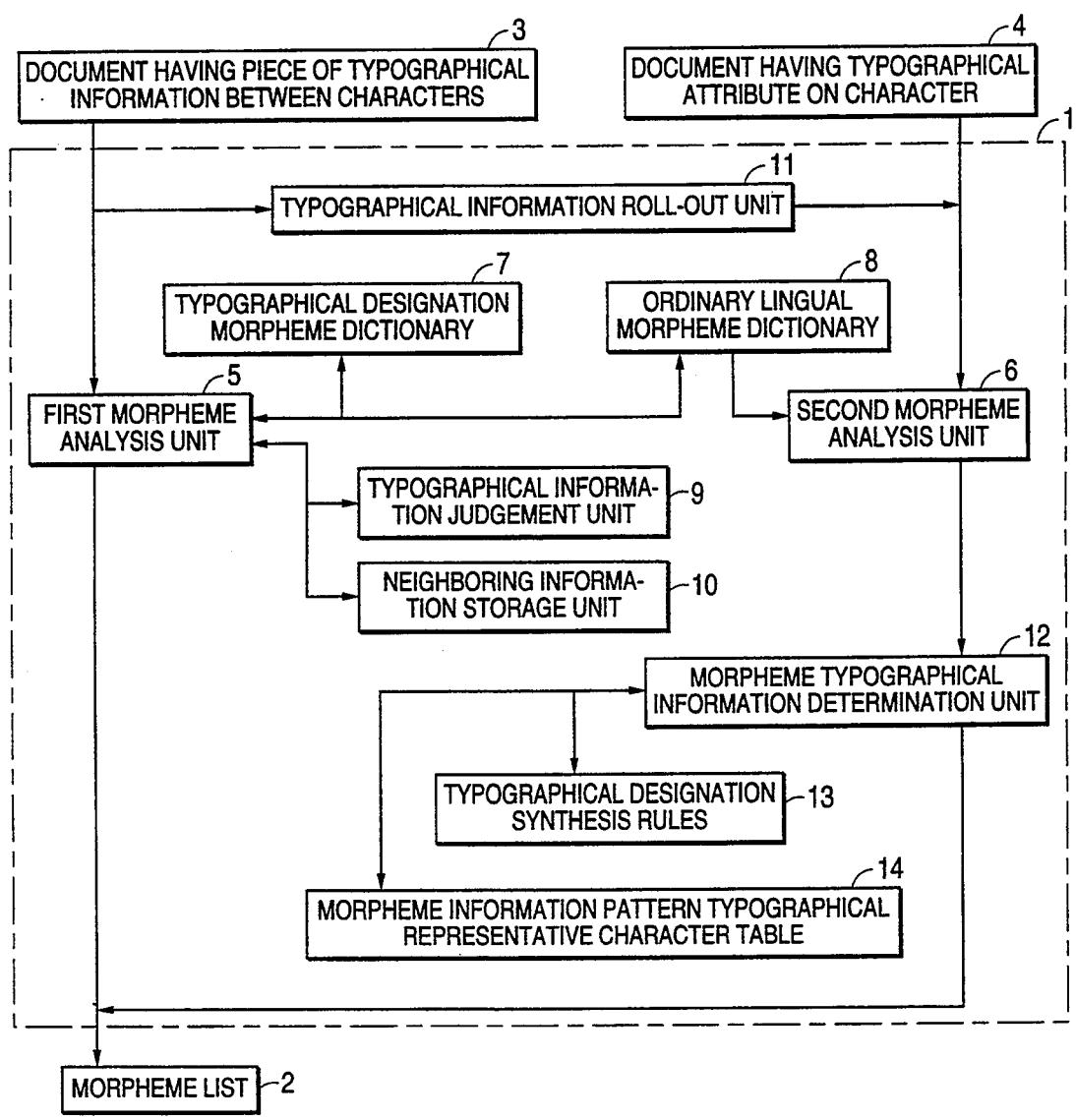
FIG. 1 is a block diagram explaining a principle for a morpheme analysis pursuant to this invention.
Figure 2:
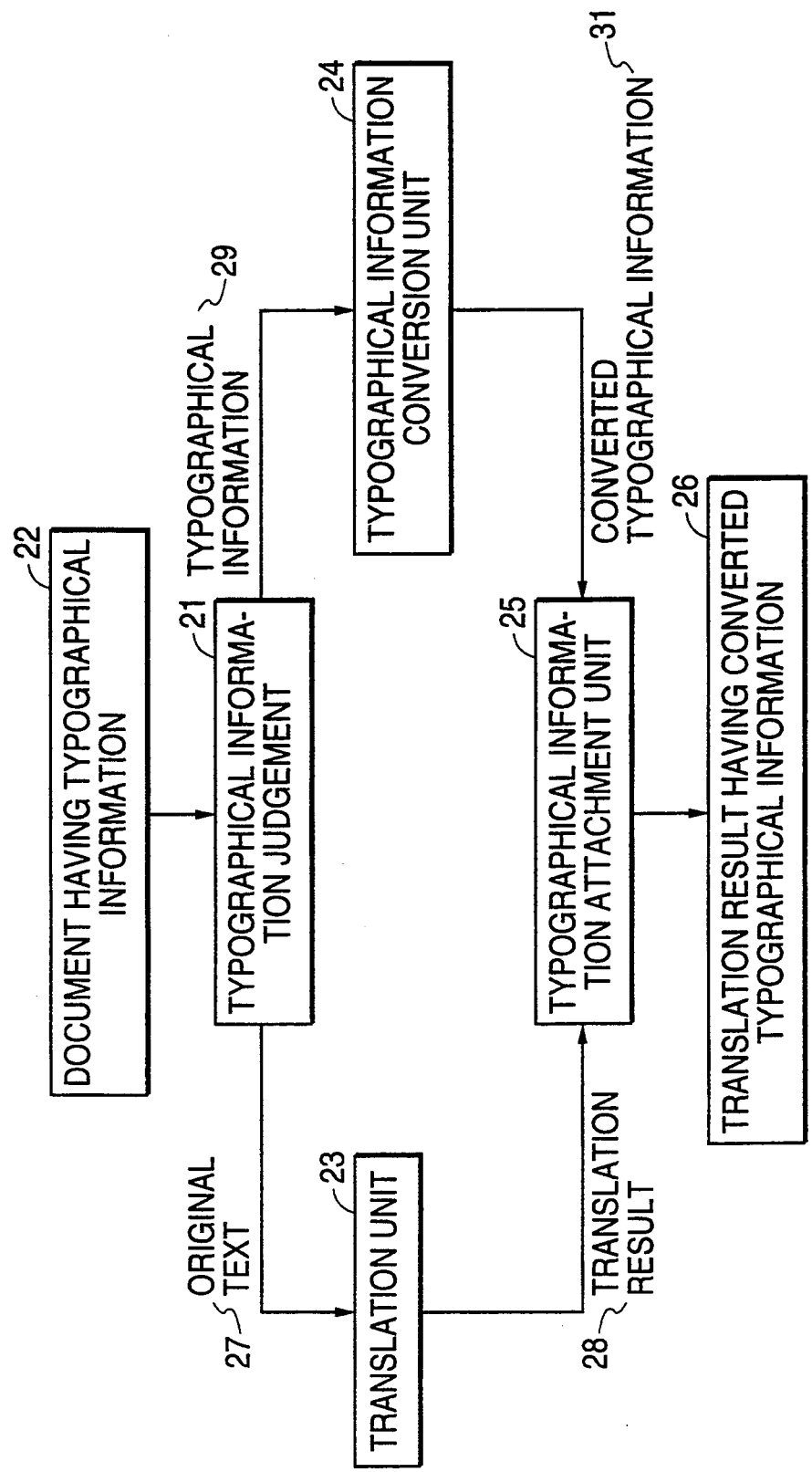
FIG. 2 is a block diagram explaining a principle for a translation pursuant to this invention.

Before going into a detailed discussion of the preferred embodiments of this invention, its underlying principle is explained first by referring to FIGS. 1 and 2.

FIG. 1 is a block diagram explaining a principle for a morpheme analysis pursuant to this invention.

More specifically, FIG. 1 shows a configuration of a morpheme analysis device 1 for recognizing typographical information attached to an input document and for analyzing a morpheme with the typographical information saved.

The morpheme analysis device 1 receives as its input document a document 3 having a piece of typographical information between characters and a document 4 having a typographical attribute on a character, and outputs a morpheme list 2.

A first morpheme analysis unit 5 analyzes the document 3 having a piece of typographical information between characters, whilst a second morpheme analysis unit 6 analyzes the document 4 having a typographical attribute on a character.

More concretely, the first morpheme analysis unit 5 analyzes a morpheme by referring to both a typographical designation morpheme dictionary 7 and an ordinary lingual morpheme dictionary 8. The first morpheme analysis unit 5 uses a typographical information judgment unit 9 and a neighboring information storage unit 10.

The typographical information judgment unit 9 judges whether a piece of morpheme information extracted from the typographical designation morpheme dictionary 7 or the ordinary lingual morpheme dictionary 8 expresses a piece of typographical information. The neighboring information storage unit 10 adds a piece of neighboring information of the preceding word to a piece of typographical information during a check of a connecting relation between the preceding word and the succeeding word with the piece of typographical information inserted.

A typographical information roll-out unit 11 rolls out on an affected character, as an attribute of the affected character, a piece of typographical information in the document 3 having a piece of typographical information between characters, thereby making the document 3 having a piece of typographical information between characters equivalent to the document 4 having a typographical attribute on a character.

By referring to the ordinary lingual morpheme dictionary 8, the second morpheme analysis unit 6 analyzes a morpheme of the document 4 having a typographical attribute on a character, with a character retaining its typographical attribute. Notwithstanding the second morpheme analysis unit 6 outputs a sentence or a phrase as a combination of morphemes, characters forming a morpheme retain typographical information held by the document 4 having a typographical attribute on a character.

Hence, the morpheme analysis device 1 comprises a morpheme typographical information determination unit 12 for determining the typographical information of a morpheme. That is, when the characters forming a morpheme have different pieces of typographical information, the morpheme typographical information determination unit 12 determines the kind of morpheme typographical information symbolizing the entire morpheme, by using either a typographical information representative character held by an entry of the ordinary lingual morpheme dictionary 8 or typographical designation synthesis rules 13, or alternatively by searching a morpheme information pattern typographical representative character table 14.

For example, when a portion "er" of a word "computer" is written in italic letters with the rest in plain letters, the Japanese word "DENSHIKEISANKI" which is a translation of "computer" needs to get a single piece of morpheme typographical information for the whole word translated.

That is, the second morpheme analysis unit 6 analyzes a morpheme of the document 4 having a typographical attribute on a character, by performing a generic morpheme analysis through a reference to the ordinary lingual morpheme dictionary 8. Then, the morpheme typographical information determination unit 12 determines the kind of typographical information attached to a morpheme.

The morpheme typographical information determination unit 12 sets the piece of morpheme typographical information either (I) by adopting a piece of typographical information of any one [1] of the characters forming a morpheme or (II) by selecting a certain piece of-typographical information from a combination of various pieces of typographical information of some of the characters forming a morpheme in accordance with a predetermined functional expression. (I) The following methods can be considered to get a piece of the typographical information of a character forming a morpheme adopted as the piece of morpheme typographical information.

(1) A method of having a piece of typographical information of a character at a certain position represent as the piece of morpheme typographical information.

This is a method of having a piece of typographical information of a character at a certain position, e.g. a head end character or a tail end character, represent as the piece of the morpheme typographical information.

For instance, if the piece of typographical information of the head end character represents the piece of morpheme typographical information, because a word "computer" in the above example uses both a piece of typographical information designating "in plain letters" and a piece of typographical information designating "in italic letters", the morpheme typographical information determination unit 12 selects a piece of typographical information designating "in plain letters" as the piece of morpheme typographical information for the translation result, i.e. a Japanese word "DENSHIKEISANKI".

On the other hand, if the piece of typographical information of the tail end character represents the piece of typographical information of the whole word, because a combination of plain letters and italic letters is used in the above example of a word "computer", the morpheme typographical information determination unit 12 selects italic letters as the piece of morpheme typographical information for the translation result.

(2) A method of having a predetermined representative letter written in each morpheme stored in the ordinary lingual morpheme dictionary 8.

For instance, by describing in advance that the piece of typographical information of a character "r" in "computer" represent the piece of morpheme typographical information, because a word "computer" in the above example uses both a piece of typographical information designating "in plain letters" and a piece of typographical information designating "in italic letters", the morpheme typographical information determination unit 12 selects a piece of typographical information designating "in italic letters" as the piece of morpheme typographical information for the translation result.

(3) A method of having a functional rule determine a representative letter from various attribute values of a morpheme. The morpheme information pattern typographical representative character table 14 stores such a functional rule.

For instance, the morpheme information pattern typographical representative character table 14 stores functional rules "Select a piece of typographical information of the tail end character of a noun as the piece of morpheme typographical information of the noun." and "Select a piece of typographical information of the head end character of a verb as the piece of morpheme typographical information of the verb." The morpheme typographical information determination unit 12 searches by the attribute value the morpheme information pattern typographical representative character table 14 for a functional rule determining the piece of morpheme typographical information. Since the morpheme typographical information determination unit 12 searches a functional rule "Use the tail end character.", because the word "computer" in the above example uses both a piece of typographical information designating "in plain letters" and a piece of typographical information designating "in italic letters" and it is a noun, the morpheme typographical information determination unit 12 selects a piece of typographical information designating "in italic letters" as the piece of morpheme typographical information for the translation result.

(II) The following methods can be considered to get a certain piece of the typographical information adopted as the piece of morpheme typographical information, from among combinations of plural pieces of typographical information in accordance with a predetermined functional expression.

(1) A method of giving in advance a priority schedule among pieces of typographical information for having a piece of typographical information with the highest priority represent as the piece of morpheme typographical information.

For instance, given a priority schedule among pieces of typographical information ["in reversely contrast letters" first, "in italic letters" second and "in plain letters" third], because a word "computer" in the above example uses both a piece of typographical information designating "in plain letters" and a piece of typographical information designating "in italic letters", the morpheme typographical information determination unit 12 selects a piece of typographical information designating "in italic letters" as the piece of morpheme typographical information for the translation result.

(2) A method of determining the piece of morpheme typographical information from among combinations of plural pieces of typographical information in accordance with predetermined typographical information designation synthesis rules.

For instance, if typographical information designation synthesis rules 13 set out functional expressions ["in reverse type letters"+"in italic letters"="in double underlines"] and ["in italic letters"+"in plain letters"="with a single underline"], because a word "computer" in the above example uses both a piece of typographical information designating "in plain letters" and a piece of typographical information designating "in italic letters", the morpheme typographical information determination unit 12 selects a piece of typographical information designing "with a single underline" as the piece of morpheme typographical information for the translation result.

The typographical designation synthesis rules 13 can be set out as complex combinations of several rules. The morpheme typographical information determination unit 12 thus determines the piece of morpheme typographical information for the translation result by a morpheme analysis, and outputs it as the morpheme list 2.

The first morpheme analysis unit 5 analyzes a morpheme of the document 3 having a piece of typographical information between characters by referring to the typographical designation morpheme dictionary 7 in addition to the ordinary lingual morpheme dictionary 8 for enabling all characters in an input document to undergo a morpheme analysis.

In judging a connecting relation of a morpheme in performing a morpheme analysis of the document 3 having a piece of typographical information between characters, when the first morpheme analysis unit 5 judges that a morpheme obtained by analyzing the document 3 having a piece of typographical information between characters is a typographical morpheme, the first morpheme analysis unit 5 regards the typographical morpheme as connectable with both the morpheme preceding the typographical morpheme and the morpheme succeeding the typographical morpheme and then uses the neighboring information of the morpheme preceding the typographical morpheme for the judgment of the connectability of the preceding morpheme with the morpheme succeeding the typographical morpheme by using the neighboring information storage unit 10. This enables a morpheme analysis to be performed for the document 3 having a piece of typographical information between characters, such as a sentence containing typographical information as a control character string, and a result of a morpheme analysis, including one for a typographical morpheme, to be obtained for an output as the morpheme list 2.

As described above, this invention enables a morpheme analysis of -the document 3 having a piece of typographical information between characters with typographical information saved. Especially, even if characters forming a single morpheme have different pieces of typographical information, this invention enables a morpheme analysis to be performed by attaching an appropriate piece of typographical information.

FIG. 2 is a block diagram explaining a principle for a translation pursuant to this invention.

More specifically, FIG. 2 shows the configuration for converting a piece of typographical information 29 attached to an original text 27 to a piece of converted typographical information 31 a user designates to be attached to the translation result 28 of the original text 27 by using the morpheme list 2 outputted from the morpheme analysis device 1.

A typographical information judgment unit 21 receives a document 22 having typographical information, and separately outputs the original text 27 and typographical information 29 after judging the kind of typographical information 29 attached to each morpheme.

A translation unit 23 translates the original text 27 separated by the typographical information judgment unit 21. And a typographical information conversion unit 24 receives the typographical information 29 separated by the typographical information judgment unit 21.

The typographical information conversion unit 24 converts the typographical information 29 attached to the original text 27 and outputs it as converted typographical information 31.

A typographical information attachment unit 25 receives a translation result 28 from the translation unit 23 and converted typographical information 31 from the typographical information conversion unit 24, and outputs a translation result 26 having converted typographical information.

The typographical information conversion unit 24 converts typographical information 29 attached to the document 22 having typographical information to desired typographical information a user designates for its output as converted typographical information 31.

Because fonts used for foreign characters other than alphabets cannot be translated into alphabetical fonts, foreign characters other than those in regular fonts are underlined, for example, with a prior user instruction.

The typographical information attachment unit 25 combines a translation result 28 from the translation unit 23 with converted typographical information 31 from the typographical information conversion unit 24, thereby outputting the translation result 26 having converted typographical information.

Thus, this invention enables a kind of the typographical information 29 attached to a morpheme to be judged, and the typographical information 29 to be converted either to a desired piece of typographical information a user designates or to a piece of typographical information appropriate to the hardware or language considered for use, for its output as a piece of the converted typographical information 31 to be attached to the translation result 28. Hence, even if the translation result 28 cannot carry a piece of typographical information 29 attached to the original text 27 "as is", the translation result 28 can nonetheless be combined with the converted typographical information 31 a user designates for an appropriate reflection of an intent of an author of the document 22 having typographical information.

Explanation of the Actual Embodiments

Figure 3:
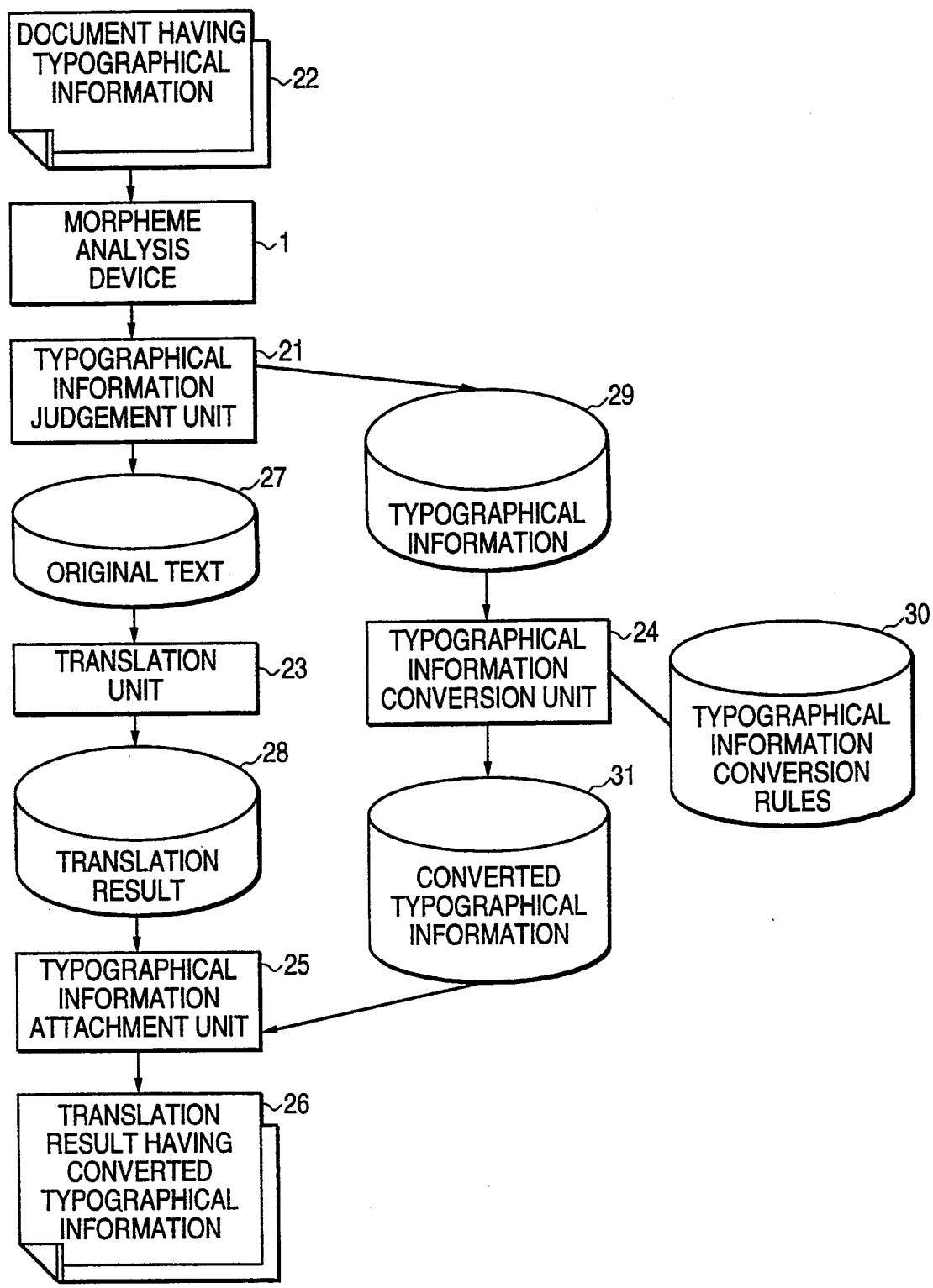
FIG. 3 is a block diagram of first and second embodiments of this invention.

FIG. 3 is a block diagram of first and second embodiments of this invention.

More specifically, FIG. 3 illustrates in detail the configuration shown in FIG. 2 in combination with the morpheme analysis device 1 shown in FIG. 1.

That is, the morpheme analysis device 1 analyzes a morpheme of the document 22 having typographical information for an output of the morpheme list 2 to the typographical information judgment unit 21.

As described earlier in the description of FIG. 2, the typographical information judgment unit 21 separates the document 22 having typographical information into the original text 27 and the typographical information 29. The translation unit 23 translates the original text 27 separated by the typographical information judgment unit 21 into the translation result 28 to be supplied to the typographical information attachment unit 25. The typographical information conversion unit 24 receives the typographical information 29 separated by the typographical information judgment unit 21.

The typographical information conversion unit 24 refers to typographical information conversion rules 30 for conversion on an as-necessary basis of the typographical information 29 according to conversion rules set out in advance as the typographical information conversion rules 30, which prescribe a piece of the converted typographical information 31 matching the translation result 28, such as "Change German fonts to an underline." and "Change bold letters to Gothic letters."

That is, the typographical information conversion unit 24 converts the typographical information 29 into the converted typographical information 31 and supplies it to the typographical information attachment unit 25, which also receives the translation result 28 from the translation unit 23. Then, the typographical information attachment unit 25 outputs the translation result 26 having converted typographical information.

Now that the outline of the overall operations of the first and second embodiments of this invention has been described by referring to FIG. 3, more concrete operations of the morpheme analysis device 1 are explained next by referring to FIGS. 4 through 8D.

Figure 4:
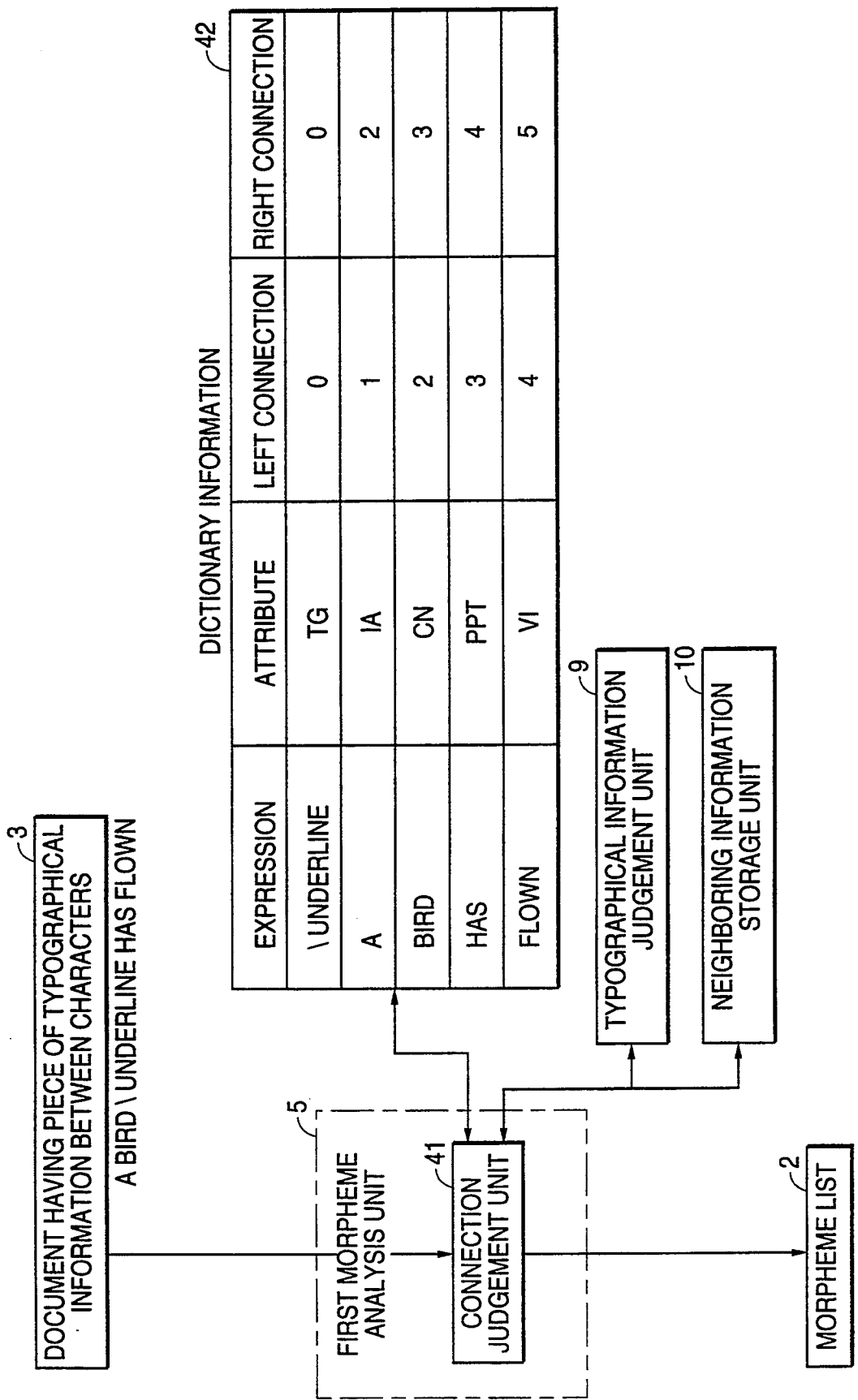
FIG. 4 is a diagram illustrating in detail the essential part shown in FIG. 1 for explaining the first embodiment.

FIG. 4 is a diagram illustrating in detail the essential part shown in FIG. 1 for explaining the first embodiment.

An outline of the operations of the morpheme analysis device 1 have already been discussed in the description of FIG. 1. Here, as a concrete example, assume the document 3 having a piece of typographical information between characters is "A bird  underline has flown.", where a sign "\ underline" is a control character string indicating "a start of an underlined expression" as a piece of typographical information. Here, in this example, the typographical information designated by the "\ underline" is interpreted as remaining in effect until the end of a sentence, unless typographical information canceling the "\ underline" appears in the subsequent text.

Dictionary information 42 indicates data on the sentence "A bird \ underline has flown." obtained from the typographical designation morpheme dictionary 7 and the ordinary lingual morpheme dictionary 8. Of the dictionary information 42, data "\ underline TG 0 O" are obtained from the typographical designation morpheme dictionary 7, and other data "A IA 1 2", "BIRD CN 2 3", "HAS PPT 3 4" and "FLOWN VI 4 5" are obtained from the ordinary lingual morpheme dictionary 8. An attribute in the dictionary information 42 represents the nature of a character. For example, "TG" refers to a piece of typographical information, "CN" refers to a countable noun, "IA" refers to an indefinite article, "PPT" refers to a present perfect tense, and "VI" refers to an intransitive verb.

To indicate a typographical morpheme, instead of using an attribute, it is also possible to assign a value not carried by an ordinary character string to pieces of neighboring information (specifying both a left connection with a preceding morpheme and a right connection with a succeeding morpheme). Also in the dictionary information 42, the morpheme entries for left and right connections other than those for a connectable piece of typographical information have the same values as the morpheme entry for the right connection of the preceding morpheme and the morpheme entry for the left connection of the succeeding morpheme. For example, in the sentence "A bird \ underline has flown.", the morpheme entry of the right connection of a morpheme "A" is "2", which is the same as the morpheme entry of the left connection of a morpheme "bird". And the connecting relation of a typographical morpheme is set, such that the morpheme is connectable with all morphemes.

The operations under this configuration are explained next. The morpheme analysis of the first and second embodiments shown in FIG. 4 assumes sequential splits of a sentence into morphemes from the left end. At this time, the neighboring information storage unit 10 stores the morpheme entry for the right connection of the preceding morpheme for its comparison with the morpheme entry of the left connection of the succeeding morpheme.

Figures 5, 7:
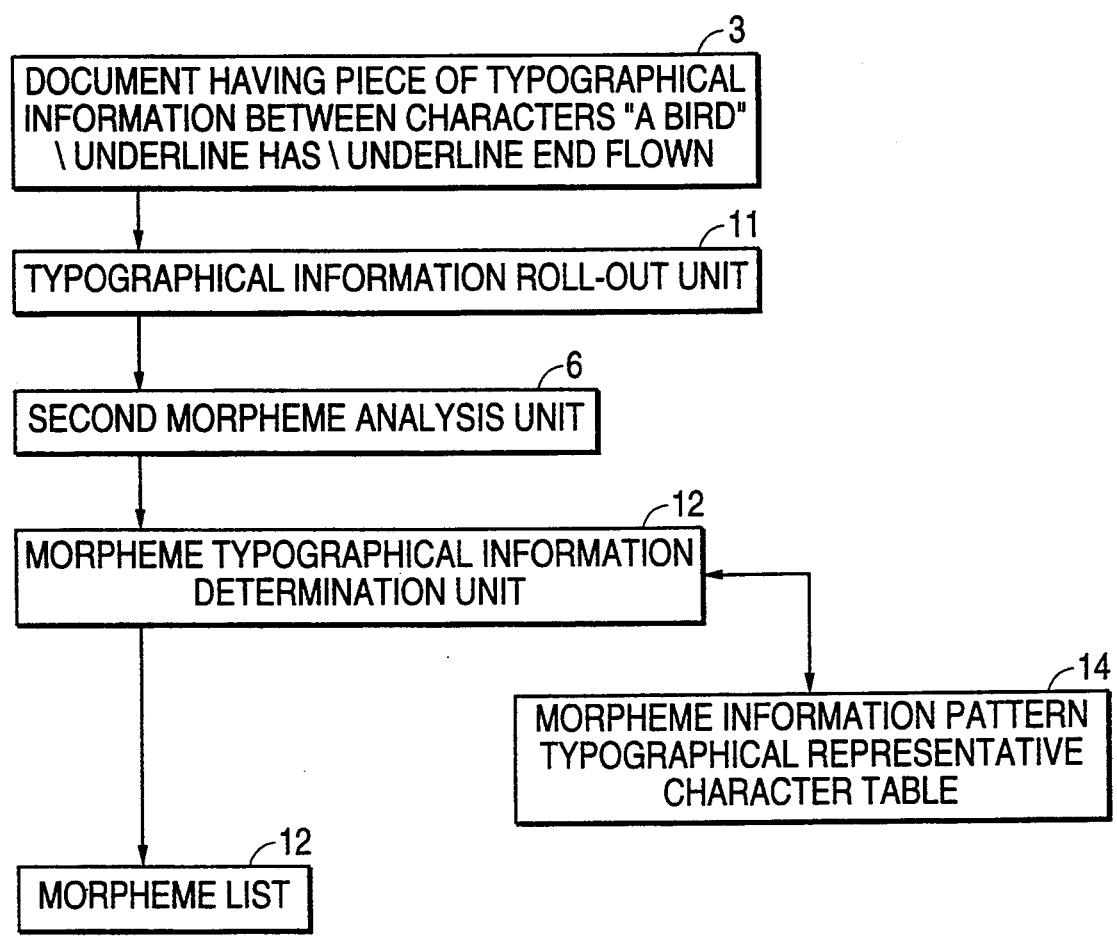
FIG. 5 is a table showing right neighboring values stored in a neighboring information storage unit shown in FIG. 4.
FIG. 7 is a diagram illustrating in detail the essential part shown in FIG. 1 for explaining the second embodiment.

FIG. 5 is a table showing right neighboring values stored in the neighboring information storage unit 10 shown in FIG. 4.

More specifically, FIG. 5 shows changes in the morpheme entries for the right connection from the initial value "1", which matches the morpheme entry for the left connection of the morpheme at the head end of a sentence.

An input sentence undergoes a morpheme analysis similar to an ordinary morpheme analysis with which the typographical designation morpheme dictionary 7 is searched. Because in the example of a sentence "A bird \ underline has flown.", two [2] words "A" and "bird" are ordinary morphemes, by having the typographical information judgment unit 9 examine the attribute of a morpheme entry, the first morpheme analysis unit 5 judges that two [2] words "A" and "bird" are not typographical morphemes. A direct comparison between the right connection of the preceding morpheme and the left connection of the succeeding morpheme confirms their connectability.

Then, when "\ underline" is extracted from the typographical designation morpheme dictionary 7, the typographical information judgment unit 9 judges from its attribute value that "\ underline" is a typographical morpheme. In this case, a value "3", the right connection value of a typographical morpheme "\ underline", stored in the neighboring information storage unit 10 is not used in the judgment of a connectability for "the typographical morpheme "\ underline" but instead restored in the neighboring information storage unit 10 "as is". At this time, the typographical morpheme "\ underline" is deemed to be connectable with all morphemes and the morpheme analysis proceeds further without actually employing the value "3", the right connection value of the typographical morpheme "\ underline", for its connection with the next morpheme. Then, a value "3", the left connection value for an ordinary morpheme "has" is compared with a right connection value extracted from the neighboring information storage unit 10. In this case, a comparison is made between the value "3", the right connection value of "bird", and the value "3", the left connection value of "has". Because both values match, the connection judgment unit 41 judges that these two [2] ordinary morphemes can be connected together, and the first morpheme analysis unit 5 continues its morpheme analysis.

After the connection judgment unit 41 in the first morpheme analysis unit 5 thus analyzes a morpheme of an input sentence, the first morpheme analysis unit 5 outputs the morpheme list 2 as a result of a morpheme analysis.

Figure 6:
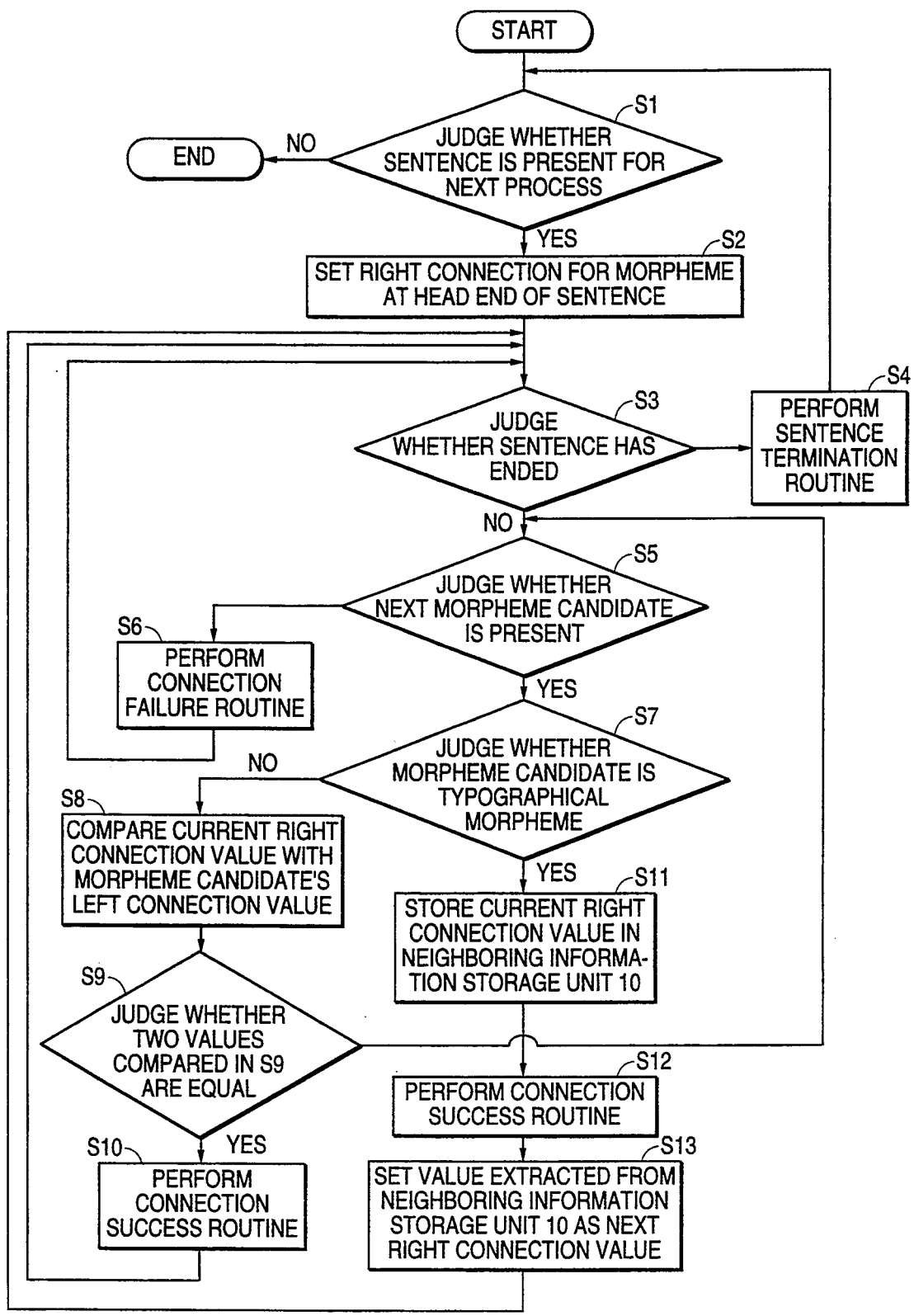
FIG. 6 is a flowchart illustrating the operational steps of the connection judgment unit shown in FIG. 4.

FIG. 6 is a flowchart illustrating the operational steps of the connection judgment unit 41 shown in FIG. 4.

The above described operations for judging a morpheme connection are summarized below.

On starting the process (START), the connection judgment unit 41 executes step S1.

Step S1: The connection judgment unit 41 judges whether or not a sentence is present for the next process. An affirmative judgment (YES) leads to step S2, while a negative judgment (NO) leads to an end (END).

Step S2: The connection judgment unit 41 sets a right connection for the morpheme at the head end of a sentence.

Step S3: The connection judgment unit 41 judges whether or not the sentence has ended. An affirmative judgment (YES) leads to step S4, while a negative judgment (NO) leads to step S5.

Step S4: The connection judgment unit 41 performs a sentence termination routine. The process reverts to step S1.

Step S5: The connection judgment unit 41 judges whether or not a next morpheme candidate is present. An affirmative judgment (YES) leads to step S7, while a negative judgment (NO) leads to step S6.

Step S6: The connection judgment unit 41 performs a connection failure routine. The process reverts to step S3.

Step S7: The connection judgment unit 41 judges whether or not the next morpheme candidate is a typographical morpheme. An affirmative judgment (YES) leads to step S11, while a negative judgment (NO) leads to step S8.

Step S8: The connection judgment unit 41 compares the current right connection value with the morpheme candidate's left connection value. The process proceeds to step S9.

Step S9: The connection judgment unit 41 judges whether or not the two [2] values compared in step S9 are equal. An affirmative judgment (YES) leads to step S10, while a negative judgment (NO) leads to step S5.

Step S10: The connection judgment unit 41 performs a connection success routine. The process reverts to step S3.

Step S11: The connection judgment unit 41 stores the current right connection value in the neighboring information storage unit 10. The process proceeds to step S12.

Step S12: The connection judgment unit 41 performs a connection success routine. The process proceeds to step S13.

Step S13: The connection judgment unit 41 sets a valise extracted from the neighboring information storage unit 10 as the next right connection value. The process reverts to step S3.

A repetition of the above procedure by the connection judgment unit 41 in the first morpheme analysis unit 5 allows the morpheme analysis device ]. to output the morpheme list 2.

FIG. 7 is a diagram illustrating in detail the essential part shown in FIG. 1 for explaining the second embodiment.

More specifically, FIG. 7 shows a procedure for a morpheme analysis by having the typographical information roll-out unit 11 equate the document 3 having a piece of typographical information between characters with the document 4 having a typographical attribute on a character.

Here, assume an input sentence "A bird \ underline has \ underline__end flown." as the document 3 having a piece of typographical information between characters. Here, "\ underline" and "\ underline__end" are two [2] pieces of typographical information inserted between characters, which together qualify characters forming an ordinary morpheme between them, thereby designating an attachment of an underline only to a word "has".

FIGS. 8A through 8D are tables explaining in further detail the second embodiment shown in FIG. 7.

FIG. 8A shows a roll-out result of an input document obtained by the typographical information roll-out unit 11.

Upon receiving the document 3 having a piece of typographical information between characters, the typographical information roll-out unit 11 recognizes the piece of typographical information by rolling out the document 3 having a piece of typographical information between characters. That is, FIG. 8A shows a roll-out result of an input sentence in the document 3 having a piece of typographical information between characters as four [4] words "A", "bird". "has" and "flown" with an underline only for one [1] word "has" and without an underline for the other three [3] words.

FIG. 8B shows a result of a morpheme analysis obtained by the second morpheme analysis unit 6.

The second morpheme analysis unit 6 receives an output of the two [2] pieces of typographical information from the typographical information roll-out unit 11 for a morpheme analysis. Here, the presence or absence of typographical information is written into the respective columns of three [3] morphemes "A", "Bird" and "Has Flown". In this case, although none of the characters forming two [2] morphemes "A" and "Bird" has any underline designation, in the morpheme "has flown" the word "has" has an underline designation and the word "flown" does not have an underline designation. This is an example of characters forming a single morpheme having different pieces of typographical information. A typographical attribute specifies the kind of a morpheme. "IA" refers to an indefinite article. "CN" refers to a countable noun. "VI/PPT" refers to an intransitive verb in a present perfect tense.

The second morpheme analysis unit 6 outputs a result of a morpheme analysis (shown in FIG. 8B) to the morpheme typographical information determination unit 12, which determines a piece of morpheme typographical information by referring to the morpheme information pattern typographical representative character table 14.

FIG. 8C shows contents of the morpheme information pattern typographical representative character table 14.

The contents of morpheme information pattern typographical representative character table 14 define which piece of typographical information for characters forming a particular word ("A", "bird", "has" or "flown") is adopted as the piece of morpheme typographical information for the morphological attributes IA, CN, and VI/PPT. That is, the contents of the morpheme information pattern typographical representative character table 14 specify that the morphological attribute "IA" is represented by the first word, the morphological attribute "CN" is represented by the last word and the morphological attribute "VI/PPT" is represented by the last word. The morpheme "A" having a morpheme attribute "IA" has the piece of typographical information for its first word represent that the underline is absent, as is clear from FIG. 8A. The morpheme "bird" having a morpheme attribute "CN" has the piece of typographical information for its last word represent that the underline is absent as is clear from FIG. 8A. The morpheme "has flown" having a morpholigidal attribute "VI/PTT" has the piece of typographical information for its first word represent that the underline is present as is clear from FIG. 8A, thereby designating the underline for the morpheme "has flown".

FIG. 8D shows an output of the morpheme list 2.

It is known from FIG. 8A that neither the morpheme "A" having a morpheme attribute "IA" nor the morpheme "bird" having a morpheme attribute "CN" has an underline designation whereas the morpheme "has flown" having a morpheme attribute "VI/PPT" has an underline designation.

That is, the morpheme list 2 shown in FIG. 8D combines data obtained from the two [2] tables shown in FIGS. 8A and 8C.

When a plurality of pieces of typographical information exist within a single word, the morpheme information pattern typographical representative character table 14 shown in FIG. 8C in which "word" is replaced by "character" is applied to the respective characters forming the single word, thereby determining unique typographical information for the whole word based on the morphological attribute of a particular character such as the last character.

The above method of determining a piece of morpheme typographical information illustrates the case of referring to the morpheme information pattern typographical representative character table 14.

Some methods of determining a piece of morpheme typographical information by referring to the typographical designation synthesis rules 13 is briefly discussed below.

Here, assume an input sentence "A bird \ underline has \ underline end flown." as the document 3 having a piece of typographical information between characters. Here, "\ underline" and "\ underline__end" are two [2] pieces of typographical information inserted between characters, which together qualify characters forming an ordinary morpheme between them, thereby designating an attachment of an underline only to the word "has". Characters for the remaining words, "A", "bird" and "flown" are written in plain letters without an underline.

An example of the typographical designation synthesis rules 13 is to create a priority table beforehand from which the priority order among pieces of typographical information for different characters is examined for selecting the piece of typographical information having the highest priority, which is kept as the piece of morpheme typographical information.

More concretely, when there are three [3] kinds of typographical information, "with an underline", "in plain letters" and "in italic letters", the priority table is created beforehand, which contains a priority order of "with an underline" first, "in italic letters" second and "in plain letters" third, for example.

Therefore, by using this, because, in the morpheme "has flown" in this example, the word "has" has a piece of typographical information "with an underline" and "flown" has a piece of typographical information "in plain letters", the piece of morpheme typographical information for the morpheme "has flown" is "with an underline."

Another example of a method of determining a piece of morpheme typographical information by referring to the typographical designation synthesis rules 13 is discussed below.

More specifically, this method is to tabulate, into a combination synthesis rule table, rules for obtaining a piece of morpheme typographical information from all combinations of pieces of typographical information for respective characters appearing in a character string forming a single morpheme. From the combination of different pieces of typographical information for respective characters appearing in the character string forming a morpheme, a synthesis result for the combination is obtained by referring to the combination synthesis rule table, which is set as a piece of typographical information of the morpheme.

More concretely, when there are three [3] kinds of typographical information, "with an underline", "in plain letters" and "in italic letters", the combination synthesis rule table is tabulated beforehand, which contains synthesis rules that a combination of two [2] pieces of typographical information "with an underline" and "in plain letters" for characters forming a single morpheme produces the piece of typographical information "with an underline" for the morpheme and that a combination of two [2] pieces of typographical information "in plain letters" and "in italic letters" for characters forming a single morpheme produces the piece of morpheme typographical information "in italic letters", for example. These synthesis rules are tabulated for all possible combinations of different kinds of typographical information in a single morpheme to obtain a piece of morpheme typographical information.

An application of the method of determining a piece of morpheme typographical information is discussed below by referring to the typographical designation synthesis rules 13.

In this example, because characters forming two [2] words "has" and "flown" in a morpheme "has flown" has a combination of two [2] pieces of typographical information "with an underline" and "in plain letters", this method determines "with an underline" as the piece of morpheme typographical information from all combinations of pieces of typographical information, for respective characters appearing in a character string forming a single morpheme, by referring to the combination synthesis rule table.

By having the typographical information roll-out unit 11 equate the document 3 having a piece of typographical information between characters with the document 4 having a typographical attribute on a character, the morpheme analysis device 1 performs a morpheme analysis of an input sentence, and outputs the morpheme list 2 such as one shown in FIG. 8D.

FIGS. 9A and 9B illustrate an example of converting typographical information in the second embodiment.

Described below are the operations for performing a morpheme analysis of the document 22 having typographical information (either the document 3 having a piece of typographical information between characters or the document 4 having a typographical attribute on a character) with typographical information 29 saved, separating the document 22 having typographical information into the typographical information 29 and the original text 27, translating the original text 27 and reflecting the converted typographical information 31 in the translation result 26 having converted typographical information. (See FIGS. 2 and 3.)

FIG. 9A represents an example of an input document having typographical information.

Assume a translation of an input phrase "The POWER of a SUN" (shown in FIG. 9A) as an example of the document having typographical information 22 shown in FIG. 3. Here, "POWER" is in fonts greater by two [2] points and SUN is in bold letters.

FIG. 9B expresses the input document by using a troff system.

A troff system expresses the input phrase shown in FIG. 9A in a format shown in FIG. 9B, where a back slash "\" is a control character. A sign "\s+2" is an instruction for instituting fonts larger by two [2] points than the original, while a sign "\s0" is an instruction for reinstating the original font size. A sign "\fB" is an instruction for instituting bold letters and a sign "\fP" is an instruction for reinstating plain letters.

That is, FIG. 9B shows "\s+2" before "Power" produces "POWER" in a font larger by two [2] points, and "\s0" reverts back to the original the font size of the letters thereafter beginning with the word "of", and "\fB"0 produces SUN in bold letters terminated by "\fP".

FIG. 10 is a table showing an example of a morpheme analysis by the typographical information conversion unit 24 with typographical information 29 saved.

On receiving the document 22 having typographical information, the morpheme analysis device 1 analyzes a morpheme with the typographical information 29 saved through methods discussed in the explanations for FIGS. 3 through 8D.

More specifically, upon receipt of the document 22 having typographical information such as one shown in FIG. 9B, the morpheme analysis device 1 analyzes morphemes "The", "Power", "of", "a" and "Sun" as shown in FIG. 10, and has the typographical information judgment unit 21 judge which piece of the typographical information 29 is attached to which morpheme. In this case, the typographical information judgment unit 21 judges that a morpheme "Power" carries a piece of typographical information "\s+2" and a morpheme "SUN" carries a piece of typographical information "\fB".

FIG. 11 is a table showing a translation result obtained from the example shown in FIG. 10.

After the morpheme analysis device 1 analyzes morphemes with typographical information saved, the typographical information judgment unit 21 separates the document 22 having typographical information into the original text 27 and the typographical information 29. The translation unit 23 translates the original text 27 into the translation result 28.

The translation result 28 comprises "Die", "Macht", "einer" and "Sonne". Here, the pieces of the typographical information 29 separated from the original text 27 are saved in correspondence with the morphemes of the original text 27 for an attachment to the translation result 28.

The typographical information conversion unit 24 converts the typographical information it receives, based on the typographical information conversion rules 30.

FIG. 12 is a table showing an example of the typographical information conversion rules 30.

More specifically, FIG. 12 shows as an example a rule of converting a piece of typographical information "\fB" into a piece of typographical information ".ul", which represents an instruction of putting an underline to the immediately succeeding morpheme. This conversion rule is provided in anticipation of a case in which an output device cannot print a bold letter, for example. There could be other conversion rules depending on the fonts existing in a translation source language but not in a translation target language, such as translating a German document written in German fonts into an English document written in Dutch fonts.

FIG. 13 is a flowchart showing operational steps of the typographical information conversion unit 24.

Step S21: The typographical information conversion unit 24 reads one piece of typographical information. Continue to step S22, unless there is any piece of typographical information left (END OF FILE) in which case the process terminates. (END)

Step S22: The typographical information conversion unit 24 searches typographical information conversion rules 30. Continue to step S23, if there is an applicable conversion rule (PRESENT). Revert to step S21, unless there is an applicable conversion rule (ABSENT).

Step S23: The typographical information conversion unit 24 replaces typographical information 29 with converted typographical information 31 by using the applicable rule found in step S22. Revert to step S21.

Thus, the above procedure is repeated by reading the next piece of typographical information until all pieces of typographical information are read.

FIG. 14 is a table showing the correspondence between the translation result 26 and the converted typographical information 31.

As is apparent, the piece of morpheme typographical information for a word "Power" (\"MACHT"), i.e. " s+2", remains unchanged but the typographical information conversion unit 24 converts the piece of morpheme typographical information for a word "SUN", ie. "\fB", to ".ul", which instructs putting an underline to a word "SUN" ("SONNE") in stead of spelling it in bold letters.

FIG. 15 illustrates the translation result 26 having converted typographical information (shown in FIG. 14) by using the troff system.

More specifically, the typographical information attachment unit 25 combines the translation result 28 with the converted typographical information 31 to produce the translation result 26 having converted typographical information.

As is evident from the description of the first and second embodiments discussing a machine translation, this invention can be applicable to any translation including but not limited to a rewriting in a same language and any mapping of a character string by an appropriate rule, such as a simple conversion of a character string. Although the above description for the first and second embodiments takes an example of a troff system as typographical information, the description for a system regarding other sorts of typographical information or for a model dependent system e.g. WYSIWYG is essentially the same.

In addition, a piece of sound information e.g. on a voice intonation can be treated similarly with a piece of typographical information.

Also, not only typographical information but also other generic markings for an emphasis, such as an enclosure by double quotation marks or double parentheses and capital letters, as well as a phrase like "nothing but" can be used as text information.

This invention enables an apparatus for translating a document having typographical information to analyze a morpheme without a loss in typographical information, even if a document whose morpheme is analyzed contains a code character string indicating typographical information or even if a character in a document contains an attribute specifying typographical information.

Especially, even when characters forming a single morpheme have different pieces of typographical information, because this invention enables a piece of morpheme typographical information to be determined, a use of a morpheme analysis device of this invention for a voice synthesis and a machine translation system greatly contributes to their performance improvements.

Besides, since this invention causes a morpheme analysis result to save pieces of typographical information of an input document for their attachment to an original text by converting to a desired piece of typographical information, even if a piece of typographical information attached to an original text cannot be used "as is", this invention allows it to be converted to another for properly reflecting an intent of the original text in a translation result, thereby improving a translation quality.

What is claimed is:

1. An apparatus for translating a document having various kinds of typographical information, comprising:

first morpheme analysis means for receiving a first character string having typographical information between characters and for analyzing a morpheme of said received first character string by treating said typographical information between characters as an ordinary lingual morpheme using an ordinary lingual morpheme dictionary and a typographical designation morpheme dictionary;

second morpheme analysis means for receiving a second character string having characters including typographical information and for analyzing a morpheme of said received second character string by saving said typographical information in correspondence with said characters using said ordinary lingual morpheme dictionary; and morpheme typographical information determination means for determining morpheme typographical information, when said characters forming a morpheme analyzed by said second morpheme analysis means include different typographical information.

2. The apparatus for translating a document having various kinds of typographical information according to claim 1, wherein:

said first morpheme analysis means further judges, from the attribute of a morpheme obtained by referring to said typographical designation morpheme dictionary and said ordinary lingual morpheme dictionary, whether or not a morpheme represents a typographical morpheme.

3. The apparatus for translating a document having various kinds of typographical information according to claim 1, wherein:

said first morpheme analysis means further connects said typographical morpheme with preceding and succeeding morphemes, by regarding said typographical morpheme as being connectable with both a morpheme preceding said typographical morpheme and a morpheme succeeding said typographical morpheme.

4. The apparatus for translating a document having various kinds of typographical information according to claim 1, wherein:

said first morpheme analysis means further judges whether or not a morpheme preceding said typographical morpheme is connectable with a morpheme succeeding said typographical morpheme, by comparing a connectability of said morpheme preceding said typographical morpheme with a connectability of said morpheme succeeding said typographical morpheme.

5. The apparatus for translating a document having various kinds of typographical information according to claim 1, wherein:

said morpheme typographical information determination means determines said morpheme typographical information for said morpheme analyzed by said second morpheme analysis means, by adopting, as morpheme typographical information, typographical information of a certain one of the characters forming said morpheme.

6. The apparatus for translating a document having various kinds of typographical information according to claim 5, wherein:

said morpheme typographical information determination means further predetermines the position of said certain one of said characters forming said morpheme.

7. The apparatus for translating a document having various kinds of typographical information according to claim 5, wherein:

said morpheme typographical information determination means further predetermines the position of said certain one of said characters forming said morpheme stored in said ordinary lingual morpheme dictionary.

8. The apparatus for translating a document having various kinds of typographical information according to claim 5, wherein:

said morpheme typographical information determination means predetermines the position of said certain one of the characters forming a morpheme by an attribute of said morpheme, said attribute including a noun and a verb.

9. The apparatus for translating a document having various kinds of typographical information according to claim 1, wherein:

said morpheme typographical information determination means determines said morpheme typographical information for said morpheme analyzed by said second morpheme analysis means, from a combination of various typographical information held by some of said characters forming said morpheme.

10. The apparatus for translating a document having various kinds of typographical information according to claim 9, wherein:

said morpheme typographical information determination means determines said morpheme typographical information from a predetermined priority order among said various typographical information.

11. The apparatus for translating a document having various kinds of typographical information according to claim 9, wherein:

said morpheme typographical information determination means determines said morpheme typographical information from said combination of said various typographical information, based on preset typographical information synthesis rules.

12. The apparatus for translating a document having various kinds of typographical information according to claim 1, further comprising:

typographical information roll-out means for rolling out a piece of typographical information, having a typographical attribute, on a character in direct correspondence and for equating a character string having typographical information between characters with a character string having typographical information on a character.

13. An apparatus for translating a document having various kinds of typographical information, comprising:

typographical information judgment means for receiving a character string having typographical information and for separating said character string into said typographical information and an original text;

translation means for outputting said original text and for outputting its translation result;

typographical information conversion means for converting said typographical information to another type of typographical information as necessary; and typographical information attachment means for attaching to said translation result supplied from said translation means said converted typographical information supplied from said typographical information conversion means.

14. The apparatus for translating a document having various kinds of typographical information, according to claim 13, wherein:

said typographical information conversion means uses predetermined typographical information conversion rules for converting said typographical information separated from said original text to some type of typographical information as necessary.

15. An apparatus for translating a document having various kinds of typographical information, comprising:

first morpheme analysis means for receiving a first character string having typographical information between characters and for analyzing a morpheme of said first character string by treating said typographical information between characters as an ordinary lingual morpheme using an ordinary lingual morpheme dictionary and a typographical designation morpheme dictionary;

a second morpheme analysis means for receiving a second character string having characters including typographical information and for analyzing a morpheme of said second character string by saving said typographical information in correspondence with said characters using said ordinary lingual morpheme dictionary;

morpheme typographical information determination means for determining morpheme typographical information, when said characters forming a morpheme analyzed by said second morpheme analysis means include different typographical information;

typographical information judgment means for separately outputting typographical information and an original text from a morpheme list received as an analysis result outputted from said first morpheme analysis means or as an analysis result outputted from said second morpheme analysis means by using said typographical information determination means;

translation means for outputting said original text and for outputting its translation result;

typographical information conversion means for converting said typographical information to some other piece of typographical information as necessary; and typographical information attachment means for attaching to said translation result supplied from said translation means said typographical information supplied from said typographical information conversion means.

* * * * *

UNITED STATES PATENT AND TRADEMARK OFFICE
CERTIFICATE OF CORRECTION

PATENT NO. : 5,361,205
DATED : November 1, 1994
INVENTOR(S) : Fumihito NISHINO et al.

It is certified that error appears in the above-indentified patent and that said Letters Patent is hereby corrected as shown below:

Column 5

Line 17, after "expression", insert paragraph indentation;

Line 53, "character" should be "character e.g.".

Column 7

Line 34, "-the" should be --the--.

Column 9

Line 18, "bird underline" should be --bird\underline--.

Column 11

Line 45, "]." should be --1--.

Column 13

Line 26, "underline end" should be --underline_end--.

Column 15

Line 9, delete "0";

Line 22, "Power" should be --power--;

Line 27, "Power" should be --power--.

UNITED STATES PATENT AND TRADEMARK OFFICE
CERTIFICATE OF CORRECTION

PATENT NO. : 5,361,205
DATED : November 1, 1994
INVENTOR(S) : Fumihito NISHINO et al.

It is certified that error appears in the above-indentified patent and that said Letters Patent is hereby corrected as shown below:

Column 16

Line 19, "(\"MACHT")" should be --("Macht")--;

Line 20, "s + 2" should be --\s+2--.

Line 24, "in stead" should be --instead--.

Column 20

Line 1, delete "a" (first occurrence).

Signed and Sealed this

First Day of August, 1995

BRUCE LEHMAN

Attest:

Attesting Officer

Commissioner of Patents and Trademarks